United States Patent
Tanaka

(10) Patent No.: US 8,467,110 B2
(45) Date of Patent: Jun. 18, 2013

(54) IMAGE READING APPARATUS, IMAGE FORMING APPARATUS, AND IMAGE READING METHOD

(75) Inventor: Yoko Tanaka, Osaka (JP)

(73) Assignee: Kyocera Document Solutions Inc. (JP)

( * ) Notice: Subject to any disclaimer, the term of this patent is extended or adjusted under 35 U.S.C. 154(b) by 537 days.

(21) Appl. No.: 12/753,679

(22) Filed: Apr. 2, 2010

(65) Prior Publication Data

US 2010/0296135 A1 Nov. 25, 2010

(30) Foreign Application Priority Data

May 21, 2009 (JP) ................................. 2009-123153
May 21, 2009 (JP) ................................. 2009-123154

(51) Int. Cl.
*H04N 1/04* (2006.01)

(52) U.S. Cl.
USPC ........... 358/475; 358/509; 358/474; 382/254; 382/167; 399/376

(58) Field of Classification Search
USPC ................ 358/475, 409, 488, 448, 520, 1.15, 358/1.9, 3.28, 1.13, 462, 437, 449, 421, 509; 382/254, 275, 167; 399/376, 370, 371
See application file for complete search history.

(56) References Cited

U.S. PATENT DOCUMENTS

| | | | | |
|---|---|---|---|---|
| 4,297,727 A | * | 10/1981 | Ogawa et al. | 358/426.13 |
| 4,711,558 A | * | 12/1987 | Tanioka et al. | 399/32 |
| 4,982,235 A | * | 1/1991 | Fujino | 358/497 |
| 5,448,685 A | * | 9/1995 | Ogura et al. | 358/1.18 |
| 5,740,497 A | * | 4/1998 | Yamada et al. | 399/87 |
| 6,198,088 B1 | * | 3/2001 | Seachman | 250/208.1 |
| 7,098,898 B2 | * | 8/2006 | Hattori et al. | 345/173 |
| 7,330,692 B2 | * | 2/2008 | Kohchi et al. | 399/376 |
| 7,336,393 B2 | * | 2/2008 | Tsutsumi | 358/1.9 |
| 7,355,633 B2 | * | 4/2008 | Kurosawa et al. | 348/211.8 |
| 7,548,353 B2 | * | 6/2009 | Kakutani | 358/487 |
| 7,558,524 B2 | * | 7/2009 | Ooshima et al. | 399/370 |
| 7,672,025 B2 | * | 3/2010 | Luo | 358/486 |
| 7,679,796 B2 | * | 3/2010 | Shoda | 358/518 |
| 7,804,627 B2 | * | 9/2010 | Horiguchi | 358/488 |
| 7,884,958 B2 | * | 2/2011 | Otsuka et al. | 358/1.15 |
| 7,914,100 B2 | * | 3/2011 | Kashimoto et al. | 347/16 |
| 8,052,145 B2 | * | 11/2011 | Skinner et al. | 271/273 |
| 8,134,753 B2 | * | 3/2012 | Ishido et al. | 358/449 |

(Continued)

FOREIGN PATENT DOCUMENTS

JP 2007-028413 2/2007

*Primary Examiner* — Negussie Worku
(74) *Attorney, Agent, or Firm* — McDonnell Boehnen Hulbert & Berghoff LLP

(57) ABSTRACT

An image reading apparatus of the present invention includes a document placing unit on which a document is placed, a light source unit in which light sources are arrayed in a depth direction, a light source drive unit that drives the light sources, and a light source control unit that controls so that the light sources are divided into a plurality of groups to be driven. An image sensor is provided at a position capable of receiving light emitted from the light sources and reflected by the document on the document placing unit. Further, the document size is detected through detection of a position of an edge of the document from an output signal from the image sensor. Then, the light source drive unit is controlled so that, when the image is to be read, the light sources are activated to illuminate the document.

19 Claims, 14 Drawing Sheets

U.S. PATENT DOCUMENTS

| | | | |
|---|---|---|---|
| 8,203,748 B2 * | 6/2012 | Tojo | 358/1.9 |
| 8,233,166 B2 * | 7/2012 | Ogasawara | 358/1.13 |
| 8,237,971 B2 * | 8/2012 | Otsuka et al. | 358/1.15 |
| 8,305,654 B2 * | 11/2012 | Takeshima | 358/474 |
| 2007/0146818 A1 * | 6/2007 | Horiguchi | 358/474 |
| 2007/0201918 A1 * | 8/2007 | Shoda et al. | 399/376 |

* cited by examiner

| IMAGE DATA ||| DOCUMENT SENSOR | SIZE |
|---|---|---|---|---|
| G3(F1) | G4(F2) | G6(F3) | | |
| BLACK | BLACK | BLACK | NONEXISTENCE | SMALLER THAN A6 |
| WHITE / BLACK | BLACK | BLACK | NONEXISTENCE | A6 |
| WHITE | WHITE / BLACK | BLACK | NONEXISTENCE | A5 |
| WHITE | WHITE | WHITE / BLACK | NONEXISTENCE | A4 |
| WHITE | WHITE | WHITE / BLACK | EXISTENCE | A3 |

FIG.12

| IMAGE DATA | | | DOCUMENT SENSOR | SIZE |
|---|---|---|---|---|
| G5(F1) | G10(F2) | G14(F3) | | |
| BLACK | BLACK | BLACK | NONEXISTENCE | SMALLER THAN A6 |
| WHITE | BLACK | BLACK | NONEXISTENCE | A6 |
| WHITE | WHITE | BLACK | NONEXISTENCE | A5 |
| WHITE | WHITE | WHITE | NONEXISTENCE | A4 |
| WHITE | WHITE | WHITE | EXISTENCE | A3 |

FIG.13

IMAGE READING APPARATUS, IMAGE FORMING APPARATUS, AND IMAGE READING METHOD

INCORPORATION BY REFERENCE

This application is based upon and claims the benefit of priority from the corresponding Japanese Patent Application No. 2009-123153 filed May 21, 2009, and Japanese Patent Application No. 2009-123154 filed May 21, 2009, the entire contents of which are incorporated herein by reference.

BACKGROUND OF THE INVENTION

1. Field of the Invention

The present invention relates to an image reading apparatus that reads a document, an image forming apparatus, and an image reading method.

2. Description of the Related Art

A typical image reading apparatus has a structure that includes a sensor for detecting a document size. For example, one generally known structure has a plurality of document detection sensors that are arrayed in a depth direction and a width direction.

In order to reduce the number of components in such a system, it is conceivable to use, for example, a light source such as a fluorescent lamp, that is used for illumination when an image of the document is to be read, for detecting the document size without providing the document detection sensors as in the related art.

In recent years, a structure having a plurality of light sources arrayed in the depth direction has been employed as the light source for the illumination.

When the document size is to be detected, activating all of the plurality of light sources arrayed as described above causes a waste of power. In addition, the excessively bright light can cause discomfort to a user.

SUMMARY OF THE INVENTION

The present invention aims to provide an image reading apparatus capable of reducing a consumed power amount and of improving convenience to the user, as well as a related image forming apparatus and image reading method.

An image reading apparatus according to an embodiment of the present invention includes a document placing unit, a light source unit having a plurality of light sources, a light source drive unit, a light source control unit that controls the light source drive unit so that the light sources are divided into a plurality of groups to be driven, an image sensor, a detection unit that detects the document size through detection of a position of an edge of the document from an output signal from the image sensor, and a reading control unit that controls the light source drive unit.

An image forming apparatus according to another aspect of the present invention is an image forming apparatus including the image reading apparatus according to the embodiment of the present invention.

An image forming method according to another embodiment of the present invention is an image reading method including a step of activating, a light source driving step, a light source control step of controlling the plurality of light sources so that the plurality of light sources are driven while being divided into a plurality of groups, a reading step of receiving light emitted from the plurality of light sources and reflected by a document on the document placing unit through an image sensor, a size detection step of detecting a document size through detection of a position of an edge of the document from an output signal sent from the image sensor, and a reading control step of causing the plurality of light sources to activate to illuminate the document.

Further features and advantages of the present invention will become apparent from the description of embodiments given below.

BRIEF DESCRIPTION OF THE DRAWINGS

FIG. 12 is a table illustrating a correspondence between the image data and the results of the size detection.

FIG. 13 is a table illustrating a correspondence between the image data and the determination result of the size detection unit.

DESCRIPTION OF THE PREFERRED EMBODIMENTS

Preferred embodiments of the present invention are described as follows.

(1) First Embodiment (1-1) Schematic Structure of Image Reading Apparatus 1

Figure 1:
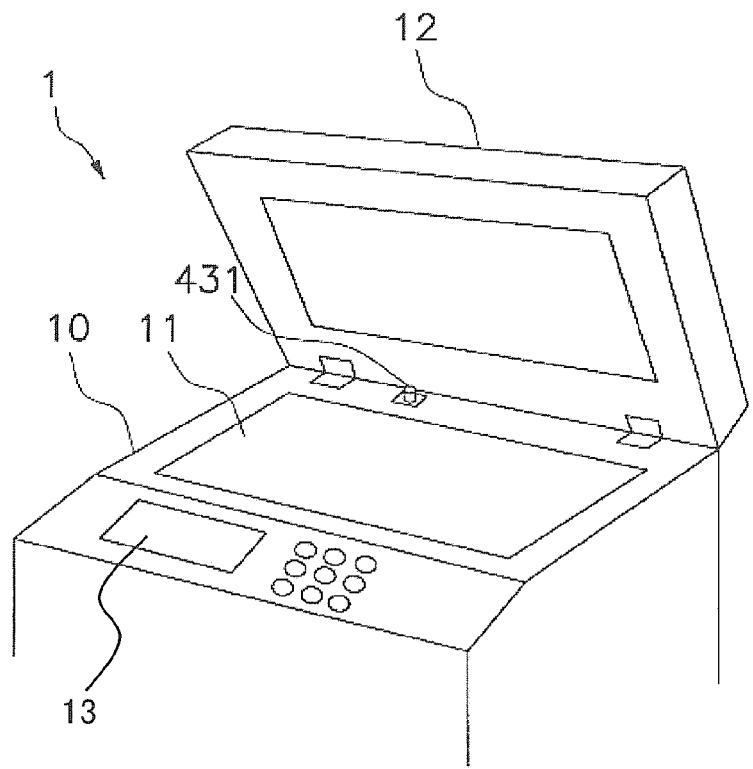
FIG. 1 is a perspective view of an image reading apparatus according to an embodiment of the present invention.

As illustrated in FIG. 1, an image reading apparatus 1 includes a housing 10, a platen glass (example of document platen) 11, a document cover 12, and a display 13.

The platen glass 11 is provided on an upper surface of the housing 10. The platen glass 11 is a plate-like member formed of a transparent material such as glass.

The document cover 12 is fixed to one of the edges of the upper surface of the housing 10 through hinges. The document cover 12 is rotated through the hinges so as to be in open and closed states with respect to the platen glass 11.

Figure 2:
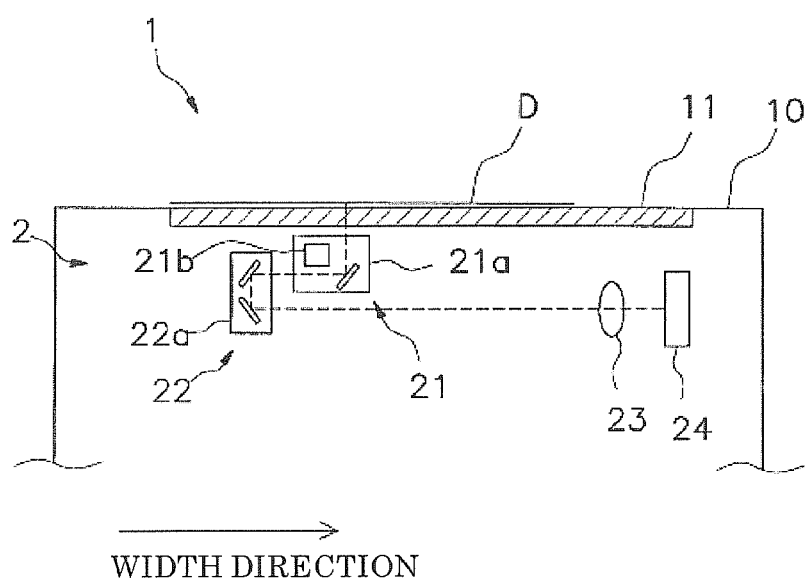
FIG. 2 is a diagram schematically illustrating an inner structure of the image reading apparatus according to the embodiment of the present invention.

As illustrated in FIG. 2, a reading unit 2 is provided in the housing 10. The reading unit 2 includes an illuminating unit 21, an optical unit 22, a lens 23, and an image sensor 24.

The illuminating unit 21 includes a first carriage 21a, a light source unit 21b, a mirror, and the like. The first carriage 21a is provided so as to be movable in a width direction. The light source unit 21b is provided in the first carriage 21a. The width direction corresponds to a moving direction of the carriage (See FIG. 2).

Figure 3:
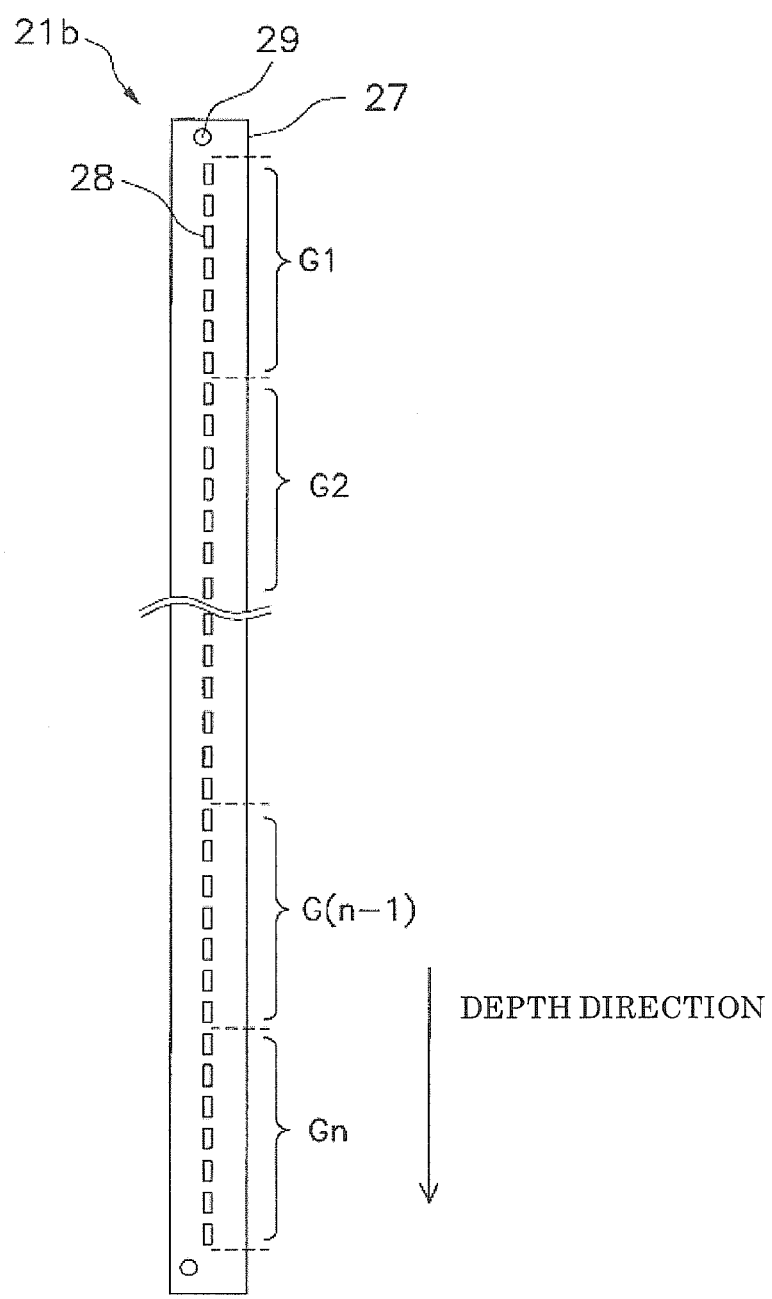
FIG. 3 is a plan view of a light source unit according to an embodiment of the present invention.

As illustrated in FIG. 3, the light source unit 21b includes a base 27 and light emitting diodes (LED) 28.

The base 27 is a plate-like member extending in a depth direction. The depth direction corresponds to a direction orthogonal to the width direction on a horizontal plane (See FIG. 3).

Figure 7:
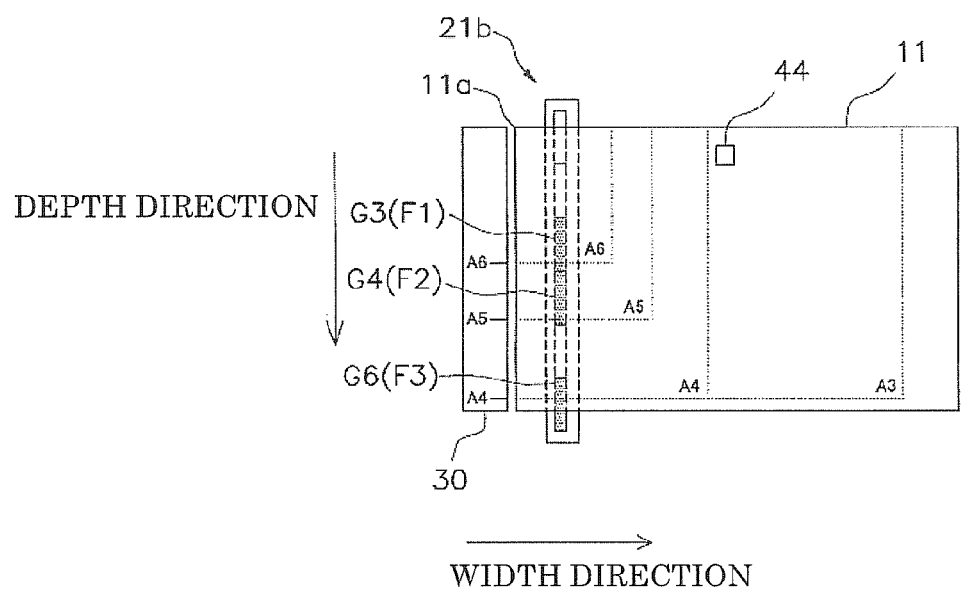
FIG. 7 is a diagram illustrating a state of activating/deactivating the light source unit when the document size is to be detected according to an embodiment of the present invention.

The length of the base 27 in the width direction is larger than a width in the depth direction of a document having a maximum size readable by the image reading apparatus 1. For example, in this embodiment, the maximum document size is A3, and as illustrated in FIG. 7, the maximum width of the document in the depth direction corresponds to the width on a shorter side of an A3-size sheet (longer side of A4-size sheet). Accordingly, the length of the base 27 in the depth direction is set to, for example, about 350 mm, which is slightly larger than the width (297 mm) on the longer side of an A4-size sheet.

The width of the base 27 in the width direction is not specifically limited, but may be set to, for example, about 15 mm.

The base 27 has mounting holes 29 in the proximity of both ends thereof in the depth direction, and the base 27 is fixed to a board with screws through the mounting holes 29. Neither the screws nor the board are illustrated.

The LED 28 is an example of a light source, which is in a rectangular shape of 1 mm×2 mm. In the light source unit 21b, a plurality of LEDs 28 are arranged in the depth direction on the base 27. As described later, the LEDs 28 are divided into n number of groups G1 to Gn (where n is natural number equal to or larger than 2), and activated and deactivating for every group.

As illustrated in FIG. 2, the optical unit 22 includes a second carriage 22a and mirrors provided in the second carriage 22a. The second carriage 22a is also provided so as to be movable in the width direction.

The lens 23 is disposed on an optical path leading from the optical unit 22 to the image sensor 24.

The image sensor 24 converts light into an electric signal. A known element such as charge coupled device (CCD) or a complementary metal-oxide-semiconductor (CMOS) may be suitably used as the image sensor 24.

Figure 4:
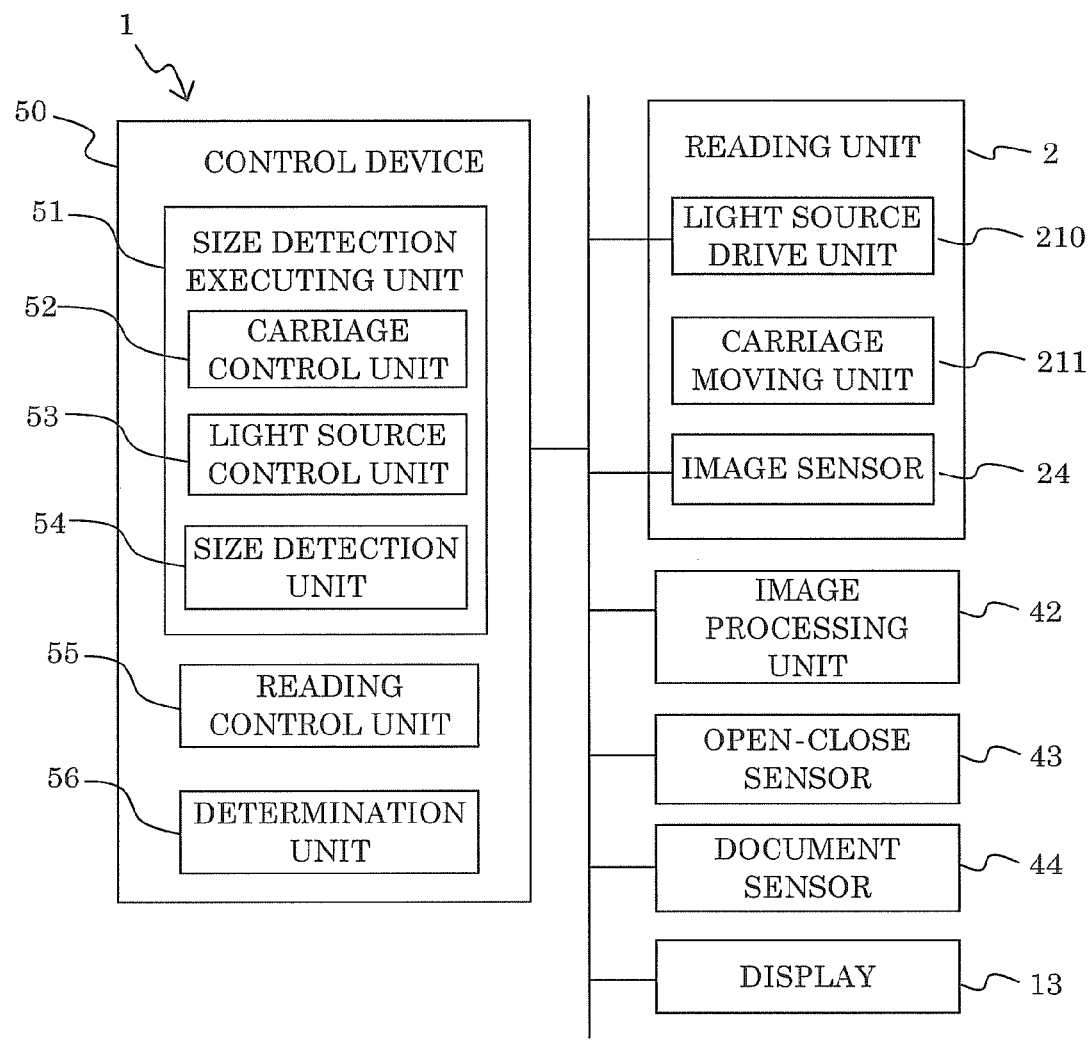
FIG. 4 is a block diagram illustrating a structure of a main part of the image reading apparatus according to an embodiment of the present invention.

As illustrated in FIG. 4, the reading unit 2 further includes, in addition to the above-mentioned elements, a light source drive unit 210 and a carriage moving unit 211.

The light source drive unit 210 activates the LEDs 28 of the illuminating unit 21. As illustrated in FIG. 3, the light source drive unit 210 is capable of collectively driving the LEDs 28 for each group of the groups G1, G2, . . . Gn. The number n may be varied according to the number of document sizes to be detected. In this embodiment, n=6, and the groups G1 to G6 each include a plurality of the LEDs 28.

The carriage moving unit 211 moves the first carriage 21a and the second carriage 22a in the width direction. Specifically, the carriage moving unit 211 includes components such as a motor and a gear, and moves the first and second carriages 21a and 22a along a rail (not shown) extending in the width direction.

As illustrated in FIG. 4, the image reading apparatus 1 further includes, in addition to the above-mentioned elements, an image processing unit 42, an open-close sensor 43, and a control device 50.

The image processing unit 42 includes an analog-to-digital (AD) converter, a shading correction circuit, and the like.

The open-close sensor 43 is connected to a button switch 431 protruding from the upper surface of the housing 10 (see FIG. 1). When a downward movement of the button switch 431 exceeds a first predetermined value, the open-close sensor 43 outputs, to the control device 50a, a signal indicating that the document cover 12 has started to close.

A document sensor 44 is an optical sensor that includes a light source and a light receiving unit. The document sensor 44 is disposed below the platen glass 11; that is, at a position capable of detecting a document size in the width direction in the housing 10.

As illustrated in FIG. 7, a document indicator board 30 is provided outside the platen glass 11 in the width direction. The document indicator board 30 is a plate-like member marked with a scale for indicating a placing position of a document D. When a document is placed according to the scale on the document indicator board 30, the document is placed so that one of the corners of the document meets an upper-left corner of the platen glass 11 of FIG. 7. The upper-left corner of the platen glass 11 is designated as an origin 11a.

In this embodiment, A6, A5, and A4-size documents may be placed so that the longer side thereof extends along the depth direction, while an A3-size document is placed so that the shorter side thereof extends along the depth direction. In other words, an A3-size document and an A4-size document are identical in length in the depth direction.

In view of this, the document sensor 44 is disposed, as illustrated in FIG. 7, between a right edge of an A4-size document and a right edge of an A3-size document, which are placed on the platen glass 11, when viewed from a user.

The control device 50 includes a size detection executing unit 51, a reading control unit 55, and a determination unit 56. The control device 50 further includes a central processing unit (CPU), and other memories including a read only memory (ROM) and a random access memory (RAM). The CPU reads programs stored in the ROM and the like, to thereby implement functions of the control device 50.

The size detection executing unit 51 includes a carriage control unit 52, a light source control unit 53, and a size detection unit 54.

(1-2) Operation of Detecting Document Size

Figure 6:
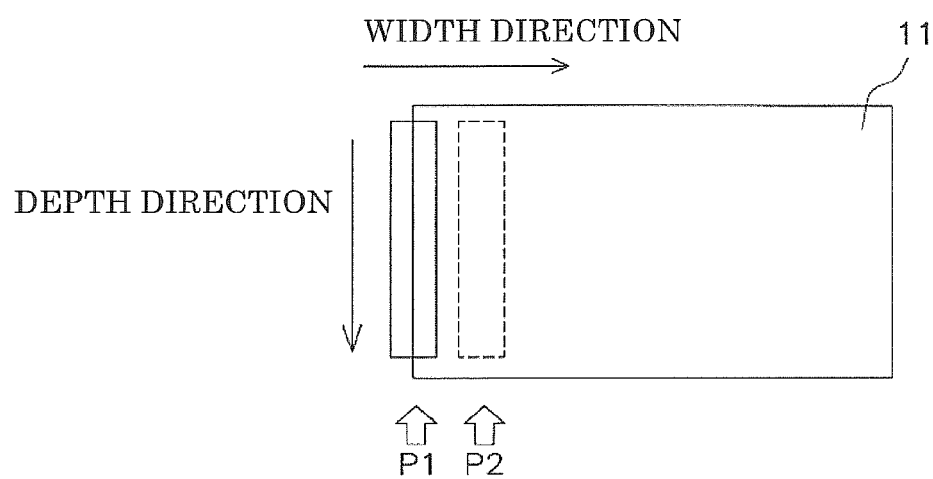
FIG. 6 is a diagram illustrating a position of a first carriage with respect to a platen glass according to an embodiment of the present invention.

During standby, as illustrated in FIG. 6, the first carriage 21a stays at a standby position P1.

Figure 5A:
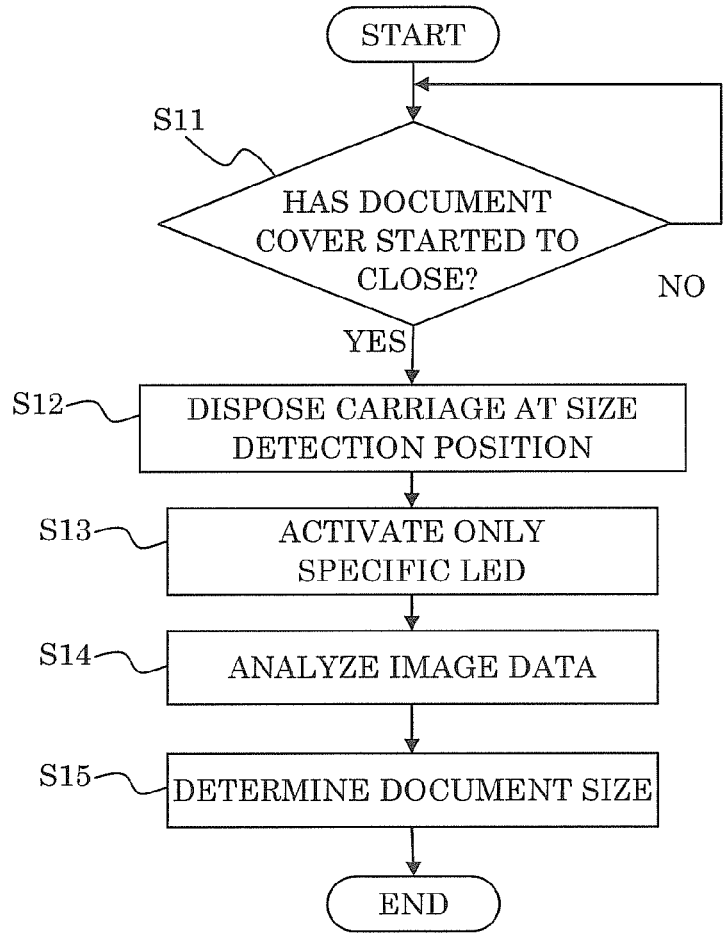
FIG. 5A is a flowchart illustrating a flow of an operation when a document size is to be detected according to an embodiment of the present invention.

As illustrated in FIG. 5A, when a signal indicating that the document cover 12 has started to close is received from the open-close sensor 43 (Yes in Step S11), the carriage moving unit 211 moves, under the control of the carriage control unit 52, the first carriage 21a in the width direction. As a result, the first carriage 21a is disposed at a size detection position P2 (see FIG. 6) (Step S12). In this case, the second carriage 22a is moved by the carriage moving unit 211, under the control of the carriage control unit 52, so as to be disposed at a position capable of guiding light from the first carriage 21a disposed at the size detection position P2 (light reflected from document D) to the lens 23 by the mirrors in the second carriage 22a.

Next, as illustrated in FIG. 5A, the light source drive unit 210 activates only specific LEDs 28, under the control of the light source control unit 53 (Step S13).

As illustrated in FIG. 7, in this embodiment, the LEDs 28 are divided into six groups G1 to G6 each including an equal number of LEDs 28, and the LEDs 28 are driven for every group by the light source drive unit 210. Below the platen glass 11, the group G3 is disposed across the edge in the depth direction of an A6-size document, the group G4 is disposed across the edge in the depth direction of an A5-size document, and the group G6 is disposed across the edge in the depth direction of an A4-size document.

In Step S13, the light source control unit 53 controls the light source drive unit 210 so as to activate only the groups G3, G4, and G6, while deactivating the rest of the groups. In other words, in this case, regions across the edges of A6, A5, and A4 (or A3) documents are illuminated on the platen glass 11.

The size detection unit 54 analyzes image data read by the image sensor 24 under the above-mentioned state (Step S14). Then, the size detection unit 54 determines the document size, based on the image data and a signal from the document sensor 44 (Step S15). More specific description thereof is given as follows.

When the LEDs 28 are activated in Step S13 with the document D being placed on the platen glass 11, light from the light source unit 21b is reflected in part by the document D, and the reflected light is further reflected by the mirror of the illuminating unit 21 and by the mirrors of the optical unit 22 so as to be guided to the lens 23. The image sensor 24 detects light, which has passed through the lens 23, and outputs an electric signal to the image processing unit 42. The image processing unit 42 processes the electric signal to thereby obtain image data, and the image data is output to the control device 50. The image sensor 24 does not detect light that is not reflected by the document D, that is, light from the LEDs 28 that are arrayed at positions on which the document D is not placed. As a result, regions outside the document D appear as black regions on the image data. A correspondence between the image data and the results of the size detection is illustrated in FIG. 12.

In FIG. 12, "G3", "G4", and "G6" correspond to image data on regions illuminated by groups G3, G4, and G6, respectively, on the platen glass 11.

When an amount of light (that is, image brightness) is equal to or larger than a predetermined value, the size detection unit 54 may identify image data on the corresponding pixels as "white" (in other words, as a region where document D exists). On the other hand, when an amount of light is less than a predetermined value, the size detection unit 54 may identify image data on the corresponding pixels as "black" (in other words, as a region where document D does not exist). Alternatively, when a difference between the sizes of signals on the pixels is equal to or larger than a certain value, the size detection unit 54 may identify data on a brighter side as "white" and data on a darker side as "black".

The image data changes from "white" to "black" at a certain point in a main scanning direction from the origin 11a side, and the point is identified as the edge of the document. Then, based on the position of the edge, the document size is determined.

As illustrated in FIG. 12, when a region illuminated by the group G3 is "black", which means that the document D does not exist in the region, the document size is determined as being smaller than A6.

Alternatively, in a case where the document size D placed on the platen glass 11 is A6, some of the LEDs 28 included in the group G3 are arrayed below the document D, and hence light from those LEDs 28 is reflected by the document D, so as to be detected by the image sensor 24 ("white" region). On the other hand, the rest of the LEDs 28 included in the group G3 are arrayed in front of the edge of the document D as seen from the user, and hence light from those the LEDs 28 is not detected by the image sensor 24 ("black" region). Accordingly, the size detection unit 54 may detect the position of the edge of the document D by analyzing the image data, to thereby determine that the document size is A6.

Meanwhile, the document size may be determined as A4 when it is determined, based on image data on a region corresponding to the group G6, that the edge of the document D falls within a region illuminated by the group G6 and an output signal from the document sensor 44 indicates nonexistence of the document D. On the other hand, the document size may be determined as A3 when the edge of the document D is placed on the group G6 and an output signal from the document sensor 44 indicates existence of the document D.

As described above, the image reading apparatus 1 is capable of determining a document size under a state where some of the LEDs 28 of the light source unit 21b are activated while the rest of the LEDs 28 are deactivated. Accordingly, as compared with a case where all the LEDs 28 are activated, power consumption may be reduced. Further, user discomfort caused by excessive brightness from the plurality of the LEDs 28 may be reduced.

It should be noted that, in this embodiment, an exemplary case of detecting a document size based on A4 to A6 sizes has been described. However, according to the present invention, the document size is not limited to A4 to A6 sizes, and the present invention may be subjected to various modifications of the design in terms of the width of the groups, correspondence between the image data and the size detection, and the like, so as to be adaptable to any size other than A4 to A6 sizes.

(1-3) Operation of Reading Image

To read an image of the document D on the platen glass 11, the image reading apparatus 1 operates as follows.

The carriage moving unit 211 moves the illuminating unit 21 and the optical unit 22 in the width direction, under the control of the reading control unit 55, so as to illuminate an entire surface of the document D. In this case, the reading control unit 55 adjusts a moving range of the illuminating unit 21 and the optical unit 22 in the width direction based on the document size detected by the size detection unit 54 described above. Specifically, when the document size is A5, the illuminating unit 21 and the optical unit 22 are moved so as to illuminate from a left edge to a right edge of an A5-size document of FIG. 7. The illuminating unit 21 is moved from the standby position P1 to the right edge of an A5-size document, and then is returned to the standby position P1, because there is no need to illuminate the right side of the right edge of an A5-size document.

A range of the LEDs 28 to be activated when reading an image may be adjusted by the reading control unit 55, based on the document size detected by the size detection unit 54. In this case, when the document size is A5, the LEDs 28 of the groups G1 to G4 are activated while the LEDs 28 of the groups G5 and G6 are deactivated.

(2) Second Embodiment

An image reading apparatus according to a second embodiment of the present invention is similar in structure to the image reading apparatus 1 according to the first embodiment, except for the structure described below. Accordingly, components and the like, which have already been described above, may be denoted by the same reference numerals, and description thereof may be omitted.

Of the groups G1 to G6 of the LEDs 28, the groups G3, G4, and G6 are designated as a first family F1, a second family F2, and a third family F3, respectively, which are controlled to be activated and deactivated by the light source control unit 53. As illustrated in FIG. 7, below the platen glass 11, the group G3 (F1) is disposed across the edge in the depth direction of an A6-size document, the group G4 (F2) is disposed across the edge in the depth direction of an A5-size document, and the group G6 (F3) is disposed across the edge in the depth direction of an A4-size document.

Figure 5B:
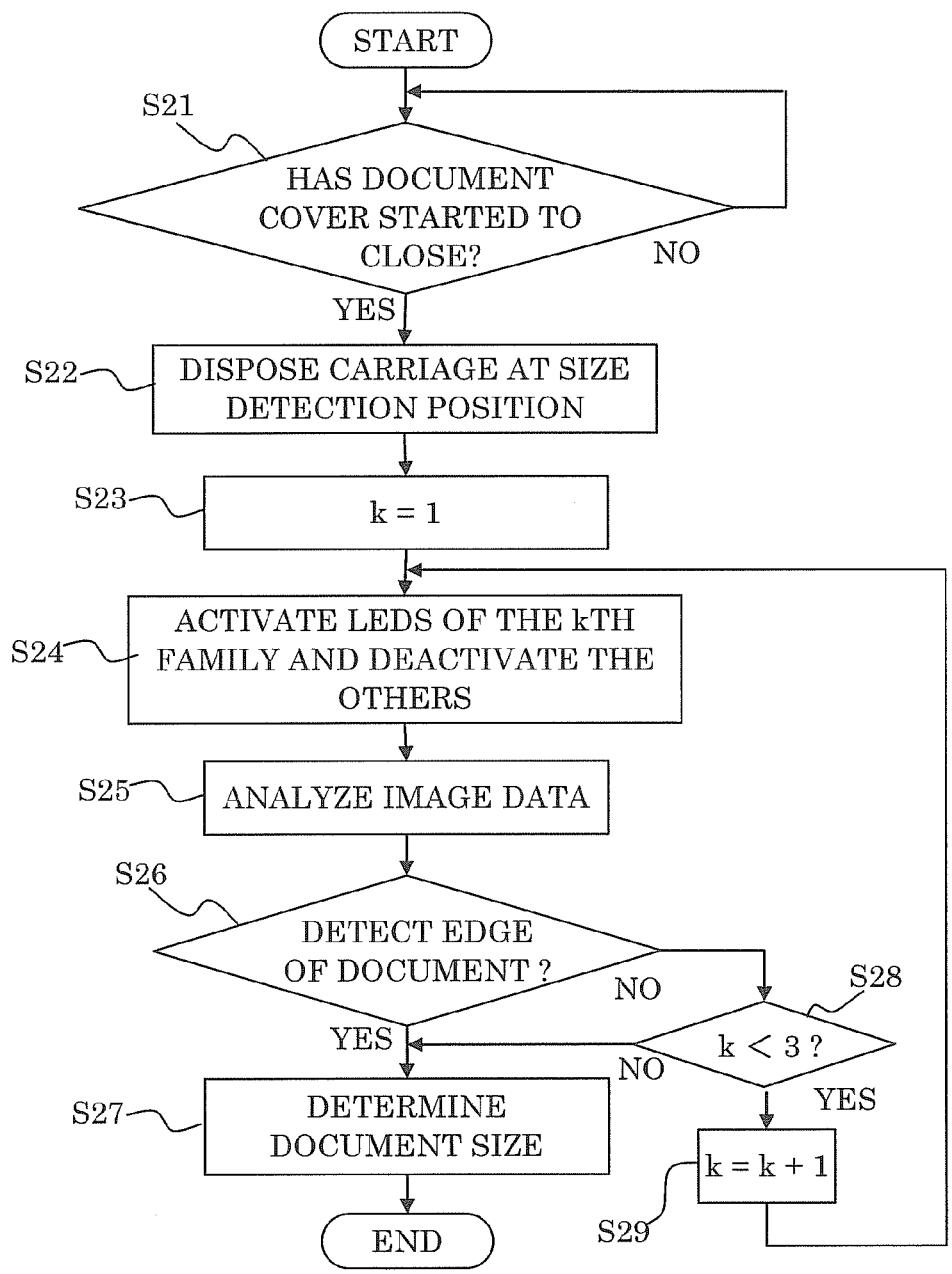
FIG. 5B is a flowchart illustrating a flow of an operation when a document size is to be detected according to an embodiment of the present invention.

As illustrated in FIG. 5B, under the control of the light source control unit 53, the light source drive unit 210 first activates the LEDs 28 of the first family F1, which are disposed closest to the origin 11a side (Steps S23 to S24). As shown in FIG. 7, "k" indicates which family number of the LEDs 28 is activated. For example, "k" is 1 when the family is the first family F1. "k" is 2 when the family is the second family F2.

The size detection unit 54 analyzes image data read by the image sensor 24 in the above-mentioned state (Step S25). Then, when it is determined, based on the image data, that the edge of the document exists at a position illuminated by the first family F1 (Yes in Step S26), the size detection unit 54 determines that the document size is A6, as illustrated in FIG. 12 (Step S27). The size detection operation is ended without activating the LEDs 28 of the rest of the groups other than the first family F1.

On the other hand, when the document is not detected by activating the first group F1 (No in Step S26), the light source control unit 53 activates the LEDs 28 of the second family F2, which is second closest to the origin 11a after the first group F1, and deactivates the LEDs 28 of the first family F1 (Yes in Step S28, S29, S24). The size detection unit 54 tries to detect the document size, as in the case where the first family F1 is activated (Step S25). When the edge of the document exists at a position illuminated by the second family F2 (Yes in Step S26), the size detection unit 54 determines that the document size is A5, as illustrated in FIG. 12 (Step S27).

If the edge of the document is not detected when the second family F2 is activated (No in Step S26), the light source control unit 53 activates the LEDs 28 of the third family F3, which is third closest to the origin 11a after the second family F2, and deactivates the LEDs 28 of the second family F2 (Yes in Step S28, S29, S24). The size detection unit 54 tries to detect the document size, as in the case where the first family F1 is activated (Step S25). When the edge of the document exists at a position illuminated by the third family F3 (Yes in Step S26) and the detection result of the document sensor 44 indicates nonexistence of the document, the size detection unit 54 determines that the document size is A4. In contrast, when the detection result of the document sensor 44 indicates existence of the document, the size detection unit 54 determines that the document size is A3. (Step S27, FIG. 12).

In a case where the document is still not detected even when the third family F3 is activated, i.e., if image data of black is always obtained as described later in any of the cases where the first family F1 to the third family F3 are activated, the size is determined as being smaller than A6 (FIG. 12).

More specific description is given as follows. When the LEDs 28 are activated with the document D being placed on the platen glass 11, light from the light source unit 21b is reflected in part by the document D, and the reflected light is further reflected by the mirror of the illuminating unit 21 and by the mirrors of the optical unit 22 so as to be guided to the lens 23. The image sensor 24 detects light, which has passed through the lens 23, and outputs an electric signal to the image processing unit 42. The image processing unit 42 processes the electric signal to thereby obtain image data, and the image data is output to the control device 50. The image sensor 24 does not detect light that is not reflected by the document D, that is, light from the LEDs 28 that are arrayed at positions on which the document D is not placed. As a result, regions outside the document D appear as black regions on the image data.

As described above, the image reading apparatus 1 is capable of determining the document size in a state where some of the LEDs 28 of the light source unit 21b are activated, and the size detection is ended when the size determination is completed, and hence the size detection is performed without activating all the LEDs 28. Accordingly, power consumption may be reduced, and user discomfort caused by the excessive brightness of the plurality of LEDs 28 may be reduced.

It should be noted that, in this embodiment, a case of performing control so as to activate a minimum number of light sources for detecting a document size up to A3 has been described. Accordingly, the light sources to be activated are limited to those of the groups of G3 to G6.

Alternatively, in order to detect the existence or nonexistence of a document on the platen glass 11, or to detect a document smaller than A6 size, all the light sources of the groups from G1 to G6 may be sequentially activated, to thereby detect a document size.

With this structure, any document size may be detected, without being limited to standard sizes.

In this case, the document size detection may be performed in all the cases where the groups G1 to G6 are activated, and when all the cases render an image in black, the determination unit 56 determines that there is no document.

When it is determined that there is no document, the display 13 may display as such accordingly, which may prevent the document from being left behind by the user.

(3) Third Embodiment

As described below, the number of groups formed by the LEDs 28 may not be limited to "6" in the first embodiment, and may be changed appropriately.

An image reading apparatus according to a third embodiment of the present invention is similar in structure to the image reading apparatus 1 according to the first embodiment, except for the structure described below. Accordingly, components and the like, which have already been described above, may be denoted by the same reference numerals, and description thereof may be omitted.

Figure 8:
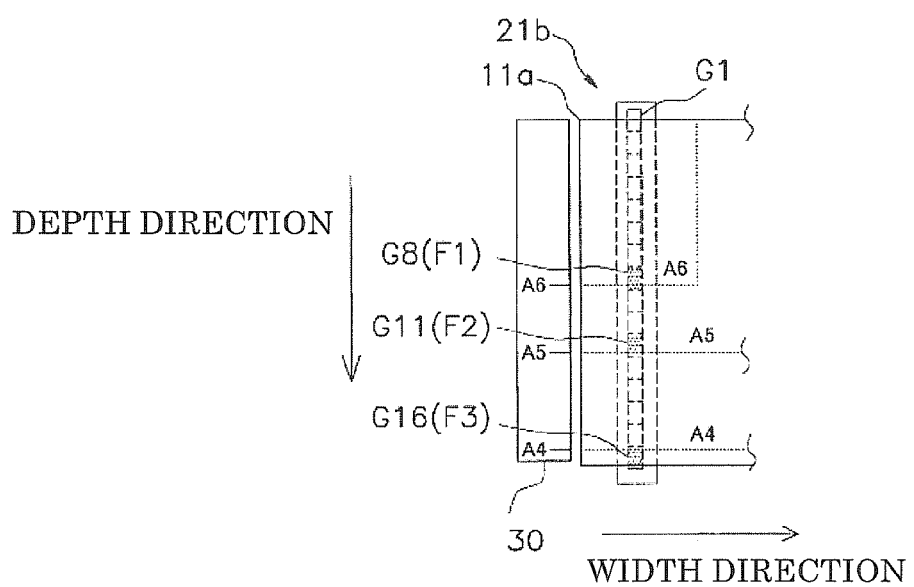
FIG. 8 is a diagram illustrating a state of activating/deactivating the light source unit when the document size is to be detected according to an embodiment of the present invention.

As illustrated in FIG. 8, the LEDs 28 are divided into 16 groups, and the light source drive unit 210 is capable of driving the LEDs 28 for every group. In other words, according to this embodiment, n=16. The groups G1 to G16 each include an equal number of LEDs 28.

As illustrated in FIG. 8, on the platen glass 11, regions illuminated by the groups G8, G11, and G16 are positioned so as to cross the edges in the depth direction of A6-size, A5-size, and A4 (A3)-size documents, respectively.

In this embodiment, when a document size is to be detected (Step s13), the LEDs 28 of the groups G8, G11, and G16 are activated while the rest of the LEDs 28 are deactivated.

When reading an image, the light source drive unit 210 may activate the LEDs 28 of all the groups G1 to G16, or may selectively activate the LEDs 28 of different groups, depending on the detected document size, to such an extent to be able to illuminate the entire document D, according to the control of the reading control unit 55.

It should be noted that, in a case where this embodiment is applied to the image reading apparatus of the second embodiment, the group G8 corresponds to the first family F1, the group G11 corresponds to the second family F2, and the group G16 corresponds to the third family F3.

(4) Fourth Embodiment

An image reading apparatus according to a fourth embodiment of the present invention is similar in structure to the image reading apparatus 1 according to the first embodiment, except for the structure described in below. Accordingly, components and the like, which have already been described above, may be denoted by the same reference numerals, and description thereof may be omitted.

Figure 9:
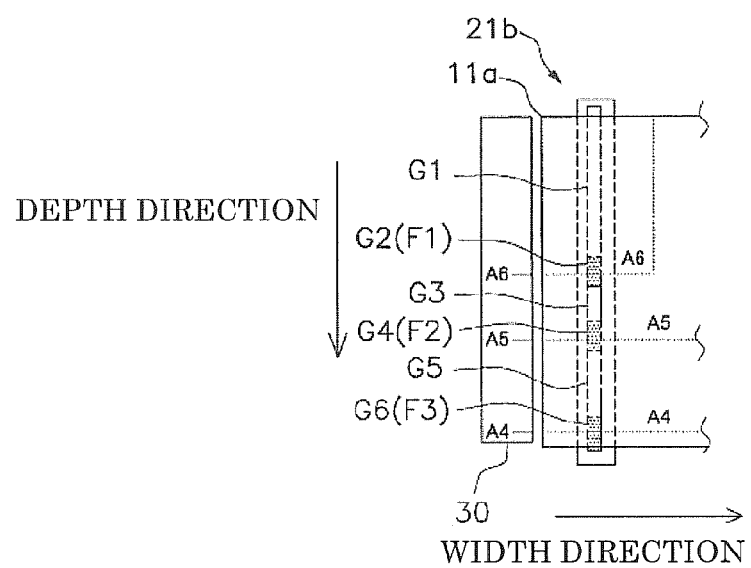
FIG. 9 is a diagram illustrating a state of activating/deactivating the light source unit when the document size is to be detected according to an embodiment of the present invention.

The light source drive unit 210 need not be limited to the structure described above with reference to the first and second embodiments, in which the LEDs 28 are equally divided to be driven. For example, as illustrated in FIG. 9, the groups G1 to Gn each may include a different number of LEDs 28. In other words, the groups G1 to Gn may be different from one another in length in the depth direction.

In this embodiment, n=6, and the LEDs 28 illuminating a region crossing the edge of an A6-size document are allocated to the group G2, the LEDs 28 illuminating a region covering an edge unit of the light source unit 21b on the origin 11a side of the platen glass 11 to a boundary with respect to the group G2 (upper side of FIG. 9) are allocated to the group G1, the LEDs 28 illuminating a region crossing the edge of an A5-size document are allocated to the group G4, the LEDs 28 between the group G2 and the group G4 are allocated to the group G3, and the LEDs 28 illuminating a region crossing the edge of an A4 (A3)-size document are allocated to the group G6, and the LEDs 28 between the group G4 and the group G6 are allocated to the group G5.

When a document size is to be detected, the LEDs 28 allocated to the groups G2, G4, and G6 are activated while the rest of the LEDs 28 are deactivated.

It should be noted that, in a case where this embodiment is applied to the image reading apparatus of the second embodiment, the groups G2, G4, and G6 correspond to the first family F1, the second family F2, and the third family F3, respectively.

(5) Fifth Embodiment

An image reading apparatus according to a fifth embodiment of the present invention is similar in structure to the image reading apparatus 1 according to the third embodiment, except for the structure of the light source control unit 53. Accordingly, components and the like, which have already been described above, may be denoted by the same reference numerals, and description thereof may be omitted.

In the first to fourth embodiments, when a document size is to be detected, regions to be illuminated on the platen glass 11 cross the edges of the standard documents. However, the present invention is not limited thereto.

For example, when a document size is to be detected, the document size may be detected without illuminating a region crossing an edge of a document, as long as regions between the edges of the standard documents each having a different size on the platen glass 11 are illuminated.

Figure 10:
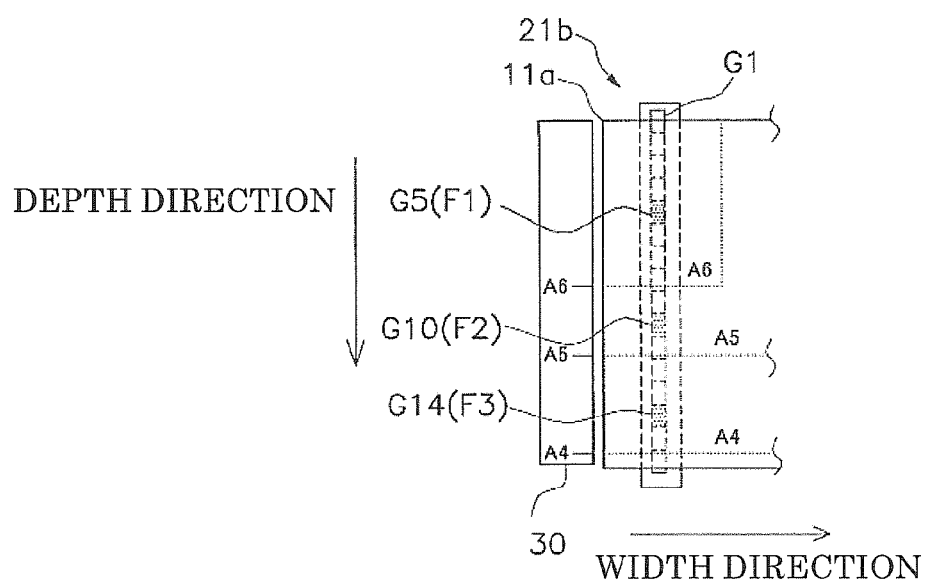
FIG. 10 is a diagram illustrating a state of activating/deactivating the light source unit when the document size is to be detected according to an embodiment of the present invention.

In this embodiment, as illustrated in FIG. 10, the LEDs 28 are equally divided into 16 groups to be driven by the light source drive unit 210 as in the second embodiment. The light source control unit 53 activates the groups G5, G10, and G14 when a document size is to be detected, while deactivating the LEDs 28 of the rest of the groups.

on the platen glass 11, regions to be illuminated by the LEDs 28 of the groups G5, G10, and G14 are positioned in proximity to the edge of an A6-size document on the origin 11a side, in between the edge of an A6-size document and the edge of an A5-size document, and in between the edge of an A5-size document and the edge of an A4 (A3)-size document, respectively.

In this embodiment, a correspondence between the image data and the determination result of the size detection unit 54 is illustrated in FIG. 13.

It should be noted that, in a case where this embodiment is applied to the image reading apparatus of the second embodiment, the groups G5, G10, and G14 correspond to the first family F1, the second family F2, and the third family F3, respectively.

Specifically, in this embodiment, the light source control unit 53 activates the LEDs 28 of at least two families, to thereby detect the edge of the document. Then, as described above, the image data changes from "white" to "black" at a certain point in the main scanning direction from the origin 11a side, and the point is identified as the edge of the document, based on which the document size is determined. Then, the LEDs 28 are deactivated when the edge of the document is identified.

Further, in this embodiment, when image data in "white" is always obtained in any of the cases where any of the three families including the first family F1 to the third family F3 is activated, the size detection unit 54 determines that the edge of the document is in line with the edge of an A4 (A3)-size document.

(6) Modification Example of First to Fifth Embodiments

When a document size is to be detected, the light source control unit 53 may control the light source drive unit 210 so as to illuminate each of the placing positions of two or more standard documents each having a different size, on the platen glass 11.

In other words, regions to be illuminated on the platen glass 11 when a document size is to be detected are not limited to those in the embodiments described above. For example, when a document size is to be detected, there may be illuminated a region defined by an edge of a standard document and a predetermined position inside the standard document. Description is given with reference to FIG. 9. The group G2 of FIG. 9 may be shifted in an upper direction so as to be arrayed so that a lower end of the group G2 may be in line with an edge (indicated by dotted line) in the depth direction of an A5-size document. The groups G4 and G6 of FIG. 9 may similarly be arrayed so that the lower ends of the groups may be in line with the edges of an A5-size document and an A4-size document, respectively.

The groups G1 to Gn each may include one or more LEDs 28, and the number of LEDs 28 included in each of the groups G1 to Gn may not be limited to a specific value.

(7) Modification Example of Second Embodiment

In the respective embodiments described above, the light source control unit 53 may keep the LEDs 28 activated without deactivating them, while detecting a document size. In other words, the process of "deactivating the rest" in Step S24 of FIG. 5B might not be performed.

Further, the LEDs 28 of three groups, namely, the first to third families, are activated, and therefore, it is determined in Step S28 whether or not k has reached "3", in order to determine the subsequent process to be performed. Alternatively, the number of groups to be illuminated may not be limited to "3" but may be any other number. In other words, the determination may be based on any numeric value other than "3", which may be determined appropriately according to the maximum number of groups to be illuminated.

For example, as in the case of the first embodiment (see FIG. 7), when the LEDs 28 are divided into 6 groups and the light source drive unit 210 drives the LEDs 28 for every group, the light source control unit 53 may be allowed to illuminate, when a document size is to be detected, all the groups G1 to G6. In other words, the groups G1 to G6 correspond to the first to sixth families F1 to F6, respectively, and the determination in Step S28 is made as "k<6?".

For example, when the document size is A5, the groups G1 to G4 are sequentially activated, to thereby perform size detection. Then, the size detection is ended without activating the group G5.

The control performed by the light source control unit 53 in the second embodiment is merely an example of controlling the light source drive unit 210, when a document size is to be detected, so as to illuminate each of the placing positions of two or more standard documents each having a different size on the platen glass 11, and positions of the LEDs 28 to be activated may not be limited to those of the second embodiment.

The light source control unit 53 operates as described above, to thereby readily determine sizes of documents that are different in size from one another.

For example, when a document size is to be detected, a region defined by an edge of a standard document and a predetermined position inside the standard document are detected. Description is given with reference to FIG. 9. The group G2 (first family F1) of FIG. 9 may be positioned in an upper direction so as to be arrayed such that a lower end of the group G2 may be in line with an edge (indicated by dotted line) in the depth direction of an A5-size document. The group G4 (second family F2) and the group G6 (third family F3) of FIG. 9 may similarly be arrayed such that lower ends of the groups may be in line with edges of an A5-size document and an A4-size document, respectively.

The size detection result obtained by the size detection unit 54 may be stored in a storage device, such as a hard disk drive (HDD) (not shown). Then, based on the size detection result in the past, the light source control unit 53 may preferentially activate the LEDs 28 of a family corresponding to a document size most frequently detected.

For example, with reference to an example illustrated in FIG. 7, in a case where an A5 size has been most frequently detected in the past, which is followed by an A4 (or A3) size, while an A6 size has been least frequently detected, the light source control unit 53 may first activate the LEDs 28 of the second family F2, secondly activate the LEDs 28 of the third family F3, and lastly activate the LEDs 28 of the first family F1.

Embodiments of present invention may include a structure obtained as a combination of the structures described above as different embodiments.

The number of the LEDs 28 included in each of the groups (families) may not be limited to two or more, and may be determined appropriately within a range from one or more. In other words, the LEDs 28 may be activated one by one from the origin 11a side.

(8) Modification Example of All the Embodiments

The image reading apparatus according to each of the embodiments may include not only a scanner for obtaining image data, but may be incorporated in a device such as a copy machine, a combined machine, or a facsimile machine.

Embodiments of the present invention may include a structure obtained as a combination of the structures described as the third to fifth embodiments.

Figure 11:
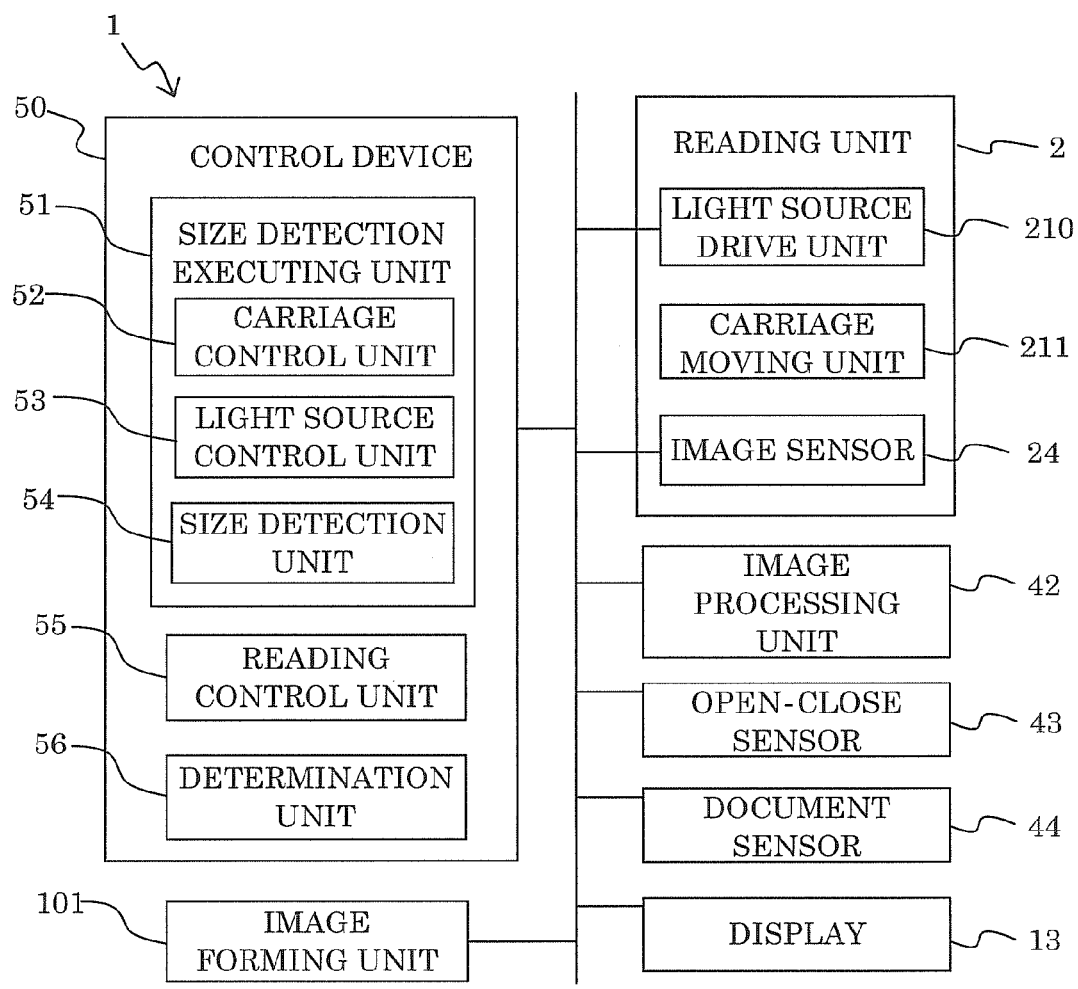
FIG. 11 is a block diagram illustrating an outline of an image forming apparatus to which an image reading apparatus according to an embodiment of the present invention is incorporated.

Further, the image reading apparatus 1 may be incorporated in an image forming apparatus 100 (FIG. 11). The image forming apparatus 100 includes an image forming unit 101 for forming an image on a recording medium (for example, sheet of paper) based on image data obtained by the reading unit 2. The image forming unit 101 may employ, for example, a mechanism such as an electrophotographic system or an inkjet system.

Preferred embodiments of the present invention are described above in detail with reference to the accompanying drawings. However, the present invention is not specifically limited in structure to the embodiments described above, and may be subjected to modification in design or the like without departing from the gist of the present invention.

What is claimed is:

1. An image reading apparatus, comprising:
   a document placing unit on which a document is placed;
   a light source unit in which light sources are arrayed in a depth direction;
   a light source drive unit that drives the light sources;
   a light source control unit that controls, when a document size is to be detected, the light source drive unit so that the light sources are divided into a plurality of groups to be driven;
   an image sensor arranged at a position capable of receiving light emitted from the light sources and reflected by the document on the document placing unit;
   a detection unit that detects the document size through detection of a position of an edge of the document from an output signal from the image sensor, wherein detecting the document size comprises the light source control unit activating a first group of light sources and deactivating a second group of light sources other than the first group of light sources; and
   a reading control unit that controls the light source drive unit so that, when the image is to be read, the light sources are activated to illuminate the document.

2. The image reading apparatus according to claim 1, wherein two or more groups of the light sources are activated and other groups of the light sources are deactivated among the plurality of groups so that placing positions of standard documents each having different sizes are illuminated on the document placing unit.

3. The image reading apparatus according to claim 2, wherein, when a document size is to be detected, the light source control unit causes the light sources to activate in the document placing unit so that a region to be illuminated by the light sources crosses a position of an edge of the standard document in the document placing unit.

4. The image reading apparatus according to claim 2, wherein, when a document size is to be detected, the light source control unit causes the light sources to activate in the document placing unit so that a region to be illuminated by the light sources is disposed between edges of standard documents each having different sizes in the document placing unit.

5. The image reading apparatus according to claim 2, wherein the light source control unit performs a control so that a group that is to be deactivated is arranged between the groups of the light sources that are activated when a document size is to be detected.

6. The image reading apparatus according to claim 1, wherein the light source control unit causes the groups of the light sources to activate at different timings for every groups of the light sources, and to deactivate when the document size has been detected.

7. The image reading apparatus according to claim 6, wherein, when a document size is to be detected, the light source control unit holds the light sources of a part of the groups of the light sources under a deactivated state.

8. The image reading apparatus according to claim 6, wherein, when a document size is to be detected, the light source control unit causes the light sources of the group of the light sources to activate in an order starting from the group that is closest to an origin.

9. The image reading apparatus according to claim 6, further comprising:
a determination unit that determines, when the light source control unit does not detect the document on the document placing unit even if all the groups of the light sources are activated, that the document is not placed on the document placing unit.

10. The image reading apparatus according to claim 9, further comprising:
a display unit that displays, when the determination unit determines that the document is not placed on the document placing unit, an indication that the document is not placed on the document placing unit.

11. The image reading apparatus according to claim 6, wherein, when a document size is to be detected, the light source control unit is capable of activating the two or more of the groups of the light sources and causing different groups of the light sources to illuminate placing positions of two or more of standard documents each having different sizes, respectively, on the document placing unit.

12. The image reading apparatus according to claim 6, wherein, when a document size is to be detected, the light source control unit is capable of activating the two or more of the groups of the light sources and causing the light sources to activate so that a region to be illuminated by different groups of light sources crosses a position of an edge of a standard document in the document placing unit.

13. The image reading apparatus according to claim 6, wherein, when a document size is to be detected, the light source control unit causes the light sources to activate in the document placing unit so that a region to be illuminated by the light sources is disposed between edges of standard-sized documents each having different sizes in the document placing unit.

14. The image reading apparatus according to claim 1, further comprising a storage device for storing the document size detected by the size detection unit.

15. The image reading apparatus according to claim 14, wherein, based on document sizes stored in the past, the light source control unit controls, when a document size is to be detected, the light source drive unit to preferentially activate a group of light sources corresponding to a document size most frequently detected.

16. An image forming apparatus, comprising the image reading apparatus according to claim 1.

17. An image reading method, comprising:
activating a plurality of light sources arrayed in a depth direction;
driving the light sources;
controlling the plurality of light sources when a document size is to be detected so that the plurality of light sources are driven while being divided into a plurality of groups of the plurality of light sources;
receiving light emitted from the plurality of light sources and reflected by a document on the document placing unit through an image sensor;
detecting, by at least a central processing unit, a document size by detecting a position of an edge of the document from an output signal sent from the image sensor, wherein detecting the document size comprises a light source control unit activating a first group of light sources and deactivating a second group of light sources other than the first group of light sources;
causing the plurality of light sources to activate to illuminate the document when reading an image.

18. The image reading method according to claim 17, further comprising storing the document size detected by the size detection unit.

19. The image reading method according to claim 18, further comprising controlling, when a document size is to be detected, the driving of the light sources to preferentially activate a group of light sources corresponding to a document size most frequently detected, based on document sizes stored in the past.

* * * * *